March 2, 1965  A. WINKLER ETAL  3,171,338
MOTOR-DRIVEN STILL CAMERAS
Filed March 5, 1962  3 Sheets-Sheet 1
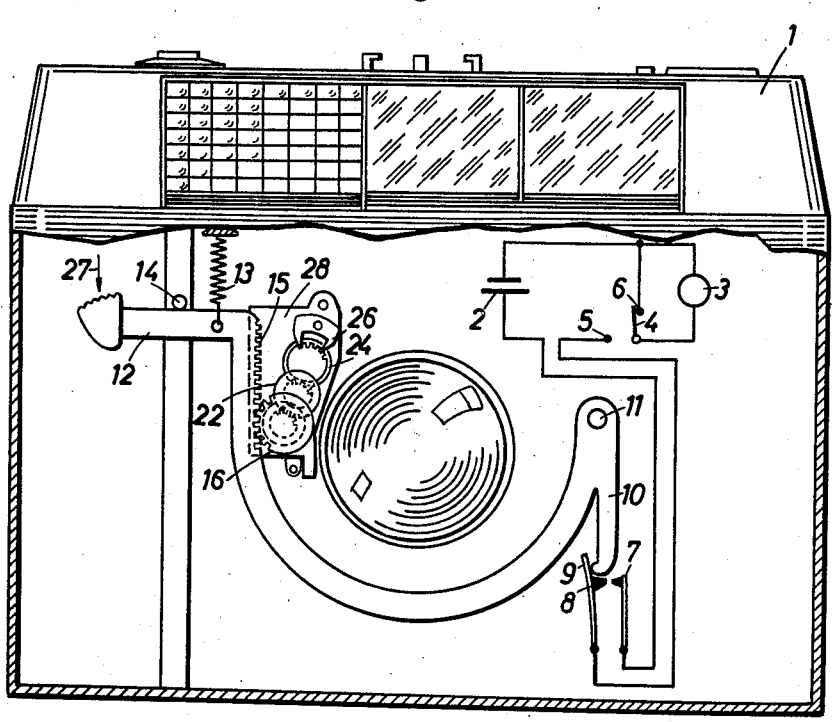
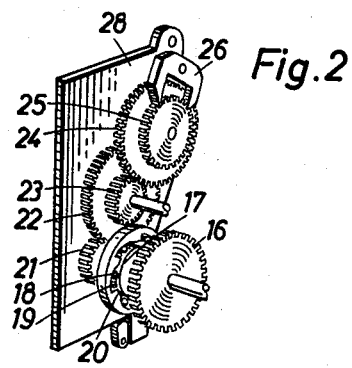
INVENTORS
ALFRED WINKLER
HEINZ ERNST
ROLF SCHRÖDER

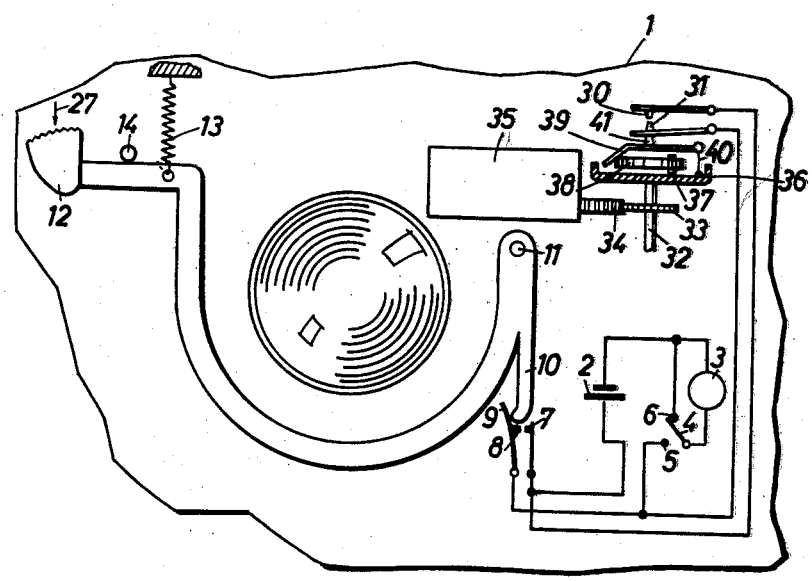
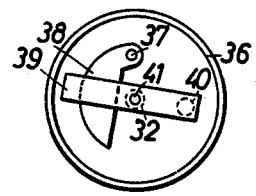

March 2, 1965   A. WINKLER ETAL   3,171,338
MOTOR-DRIVEN STILL CAMERAS
Filed March 5, 1962   3 Sheets-Sheet 3

INVENTOR.
ALFRED WINKLER
HEINZ ERNST
ROLF SCHRÖDER
BY Richael S. Striker

United States Patent Office 3,171,338
Patented Mar. 2, 1965

3,171,338
MOTOR-DRIVEN STILL CAMERAS
Alfred Winkler, Heinz Ernst, and Rolf Schröder, Munich, Germany, assignors to Agfa Aktiengesellschaft, Leverkusen-Bayerwerk, Germany
Filed Mar. 5, 1962, Ser. No. 177,521
Claims priority, application Germany, Mar. 3, 1961,
A 36,873
13 Claims. (Cl. 95—31)

The present invention relates to cameras.

More particularly, the present invention relates to still cameras which are provided with electric motors which serve, after each exposure, to advance the film by one film frame and, for example, to cock the shutter so that the camera is in this way rendered automatically ready to make the next exposure.

With cameras of this type, the camera is provided with a battery located in a suitable electrical circuit with the electric motor so that the latter derives its energy from the battery.

With cameras of this type there is a particular drawback which provides a substantial disadvantage in this type of construction. This drawback resides in the fact that there are times when the film simply cannot be advanced through an entire film frame, and during such times the circuit of the electric motor will remain closed but the electric motor cannot operate any more so that the result is that the energy is rapidly drained from the battery. Of course, if the operator were aware of the fact that this type of undesirable operation was taking place the operator could immediately replace the exhausted battery so as to alleviate, at least to some extent, the inconvenience and disadvantage of this type of construction. However, the operator simply is unaware of this fact and proceeds to make additional exposures and only then finds out that the camera is not operating properly. For example, when the end of a film strip is reached, the motor will attempt to advance the film by one film frame but will be incapable of doing so with the result that the circuit will remain closed but the motor cannot turn further and thus the energy will be rapidly drained from the battery. The operator, is unaware of this fact and proceeds to remove the exposed film and replace it with unexposed film and only when he then proceeds to attempt to make exposures on the new film does the operator realize that the camera will not function properly. Also, it may happen that part of the film between a pair of perforations will become torn, and thus prevent further advancing of the film and here again it may well happen that the motor cannot continue to turn while its circuit remains closed so that, unknown to the operator, the energy is rapidly draining from the battery, and when later on the faulty conditions are alleviated and the operator tries to make an exposure he finds that the camera does not operate properly.

It is accordingly a primary object of the present invention to provide a camera of the above type which will avoid the above drawbacks.

Another object of the present invention is to provide in a camera a construction which will automatically guarantee that the circuit of the electric motor will open after a given length of time which is, of course, at least sufficiently great to allow the electric motor to advance the film by one film frame and to cock the shutter, for example.

A further object of the present invention is to provide a structure which is capable of automatically opening the circuit of the electric motor whenever something prevents the electric motor from operating through its normal cycle of operations.

A still further object of the present invention is to provide a structure of the above type which can take advantage of the presence of certain mechanisms in the camera to make additional use of these mechanisms for the purpose of effecting the results of the invention.

Still another object of the present invention is to provide a structure of the above type which is exceedingly simple and inexpensive and which will require substantially no changes in the construction of or increase in the size of a conventional camera of the above type.

With the above objects in view, the invention includes, in a motor-driven still camera, an electric motor and an electric circuit in which the motor is located, this circuit including a battery from which the motor derives its energy and at least one switch when it is closed closes the electric circuit and when it is opened opens the electric circuit. The structure of the invention further includes a driven element and a drive means which drives the driven element at least during part of the time that the electric motor operates, and in accordance with the present invention an automatic means cooperates with the driven element and with the above-mentioned switch of the electric circuit to automatically open this switch, and thus open the circuit, when the driven element comes to rest.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of one embodiment of a structure according to the present invention;

FIG. 2 is a perspective illustration of a retarding means and one-way drive used with the structure of FIG. 1;

FIG. 3 is a fragmentary diagrammatic illustration of another embodiment of a structure according to the present invention; and FIG. 4 is a top-plan view of a centrifugally operated structure of the embodiment of FIG. 3;

Figure 5:
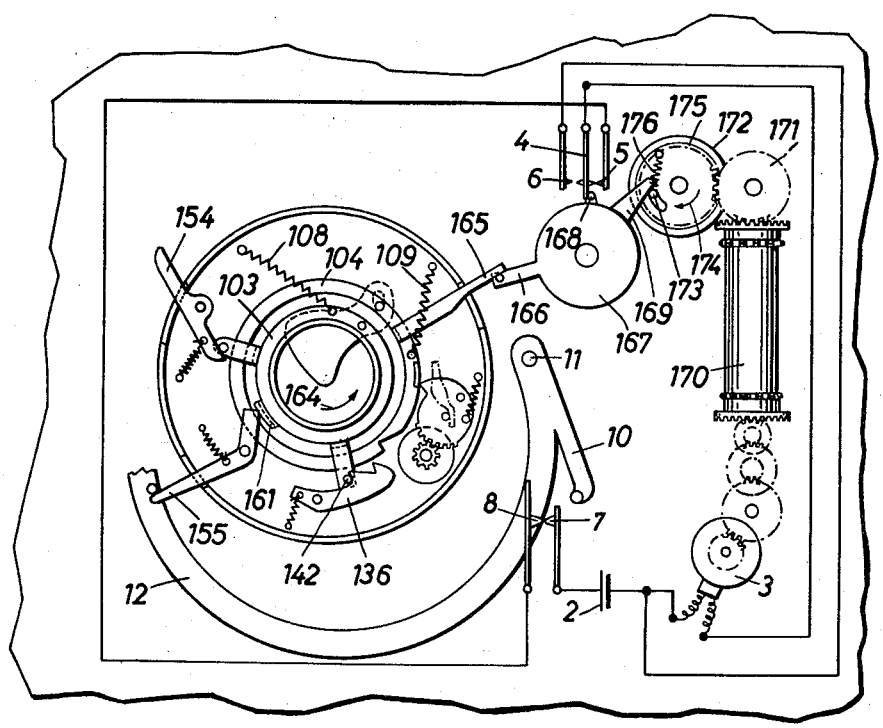
FIG. 5 shows further details according to the invention.

Referring to FIG. 1, there is shown therein a camera 1 which includes a motor 3 which in a well-known manner actuates the structure for transporting the film, this motor 3 being located in a electric circuit which includes the battery 2 from which the motor 3 derives its energy when this circuit is closed. When the shutter is actuated, then through an unillustrated and known drive the switch 4 of the electric circuit is moved into engagement with the contact 5 so as to close, in a conventional construction, the circuit of the electric motor and thus the motor will start to operate and will transport the film by one film frame and will also simultaneously cock the shutter preparatory to making the next exposure. After the film has been advanced by one film frame, the switch 4 is returned to the position shown in FIG. 1, in a well-known manner not shown in the drawing, and in this way the electric circuit is opened and the motor stops operating. Thus, the electric motor 3 forms a motor means which is energized after actuation of the shutter to make an exposure and when thus energized operates automatically through one cycle of operations and then automatically stops operating at the end of this cycle, the motor means during this cycle being adapted to perform such functions as cock the shutter and transport the film by one film frame after each exposure. The electrical circuit in which the motor means is located is of course automatically closed after actuation of the shutter and is automatically opened when the motor means 3 reaches the end of its cycle of operations. In order to provide a very rapid stopping of the turning of the motor the switch 4, when it is in its rest position, engages the contact 6 shown in FIG. 1 so as to short-circuit the motor and thus very quickly stop the turning thereof. This is the position in which the parts are shown in FIG. 1. In the event that there were no further switches in the electric circuit, then there would be a danger that the switch 4 would not be turned away from the contact 5, for example at the end of a film strip where the film can no longer be transported by one film frame. Under these conditions the battery would be very quickly drained of its energy since the circuit would of course remain closed far beyond the time that it normally remains closed, and the operator would be entirely unaware of this fact. When the exposed film is exchanged for new film, the operator would then find to his surprise that the camera was not in an operative condition as a result of the exhausted battery.

In accordance with the present invention, draining of the energy from the battery upon incomplete transportation of the film is avoided. This result is brought about with the embodiment of FIG. 1 through an additional switch 7, 8 which is connected in series with the contact 5. The contact 8 is carried by a leaf spring 9 which is actuated by an arm 10 of a lever 12 which is manually operable and which is supported for turning movement about a stationary pivot pin 11, this lever 12 being operated by the operator of the camera in connection with the release of the shutter to make an exposure. A spring 13 urges the manually operable lever 12 to a predetermined rest position shown in FIG. 1 where the lever 12 engages a stationary stop member 14.

With the embodiment of FIG. 1, the lever 12 includes a rack portion 15 which meshes with a pinion 16 of a one-way drive which connects the lever 12 to a retarding means, one-way drive means 17–20 cooperating with the first gear 21 of the train of gears 21–25 of the retarding means 21–26 which includes the escapement anchor 26 cooperating with the last gear 25 of the gear train, and all of this structure is carried by a plate 28, as shown in FIG. 2. The plate 28 is of course a stationary plate carried by any suitable structure in the camera, and the gear 25 is in the form of an escapement wheel cooperating with the element 26. The one-way drive includes the member 20 which is fixed to the gear 21 coaxially therewith so as to turn the latter when the member 20 turns, and this member 20 is formed with a plurality of wedge-shaped recesses in which are located ball members 18 acted respectively upon by springs 19. The member 17 which is fixed to the pinion 16 so as to turn therewith cooperates in a well-known way with these ball members so as to urge them toward the larger ends of the wedge-shaped recesses as long as elements 16 and 17 turn in a counter-clockwise direction, as viewed in FIGS. 1 and 2. However, when elements 16 and 17 turn in a clockwise direction, as viewed in FIGS. 1 and 2, the ball members 18 become wedged against elements 17 and 20 so that the latter can be turned only in a clockwise direction, and thus a one-way drive is provided. It will be noted that when the operator depresses the lever 12 in the direction of the arrow 27, shown in FIG. 1, in opposition to the spring 13, the pinion 16 will turn in a counter-clockwise direction, as viewed in FIG. 1, so that at this time there will be no actuation of the retarding means. However, when the operator releases the lever 12 so that it is returned to its rest position by the spring 13, then the pinion 16 turns in a clockwise direction, and thus at this time through the one-way drive the retarding mechanism is set into operation and retards the return movement of the lever 12 by the spring 13, so that the lever 12 will not reach its rest position until after a predetermined period of time has elapsed after release of the lever 12 by the operator.

When the lever 12 is depressed by the operator it will actuate the shutter in order to make an exposure, all of this taking place in a well-known manner which does not form part of the present invention and which is not shown in the drawing, and of course this turning of the lever 12 by the operator in opposition to the spring 13 turns the arm 10 of the lever away from the leaf spring 9 so that the contact 8 engages the contact 7 and the switch 7, 8 closes. It will be noted that while the switch 7, 8 closes the switch 4 has not yet engaged the contact 5, so that the motor 3 does not yet start to operate. However, after an exposure has been made and the shutter has run down, the switch 4 automatically engages the contact 5, in a manner well-known in the art, and now the circuit will be closed and the motor 3 will operate so as to advance the film by one film frame. With the normal operation, after the film has been advanced by one film frame the switch 4 turns away from the contact 5 so as to again open the circuit and so as to short-circuit the motor, as described above. However, if because of tearing of the film at its perforations or because of reaching the end of the film strip transporting of the film by a full film frame is prevented, then the switch 4 remains in engagement with the contact 5. However, the operator will release the lever 12 after having actuated this lever in order to actuate the shutter and make an exposure, and after the operator releases the lever 12 it returns to its rest position with the time delay provided by the retarding mechanism which operates at this time due to the clockwise turning of the pinion 16 and the engagement of the one-way drive, as described above. Thus, it will be seen that the lever 12 is a driven element which is driven by a drive means 13 to a position where the driven element comes to rest, and when this driven element comes to rest its arm 10 will of course open the switch 7, 8 as shown in FIG. 1. In this way, the circuit of the electric motor is automatically opened at the latest by the time that the lever 12 returns to its rest position even if the film has not been advanced by a full film frame, and thus undesired draining of the energy of the battery 2 is avoided. Of course, the time delay provided by the retarding means is so great that a normal transportation of the film by one film frame can take place before the lever 12 opens the switch 7, 8.

According to the embodiment of the invention which is illustrated in FIGS. 3 and 4, instead of a mechanical retarding means there is a centrifugal means which provides an electrical control which will also produce the results of the invention. Thus, with the embodiment of FIG. 3 there are a pair of switches connected in parallel in the circuit of the electric motor 3, one of these switches being the above-mentioned switch 7, 8, and the other switch being a switch 30, 31. The shaft 32 of the motor 3 is diagrammatically illustrated in FIG. 3, and this shaft 32 fixedly carries a pinion 33 which drives a gear 34 which serves to transmit the drive from the motor to the film-transporting structure 35 which is diagrammatically illustrated in FIG. 3 and which is of a conventional construction. In addition, a centrifugal means is carried and driven by the shaft 32 and serves to control the opening and closing of the switch 30, 31. This centrifugal means includes the carrier member in the form of a plate 36 fixedly carried by the shaft 32 coaxially therewith for rotation therewith, and this plate 36 fixedly carries a pivot pin 37 on which a fly-weight 38 is freely turnable while being spaced from the carrier 36. The carrier 36 also fixedly carries a shaft 40 to the free end of which is connected an elongated leaf spring 39, and this leaf spring 39 fixedly carries a switch-actuating pin 41 which is coaxial with the shaft 32 so that the pin 41 simply turns about its own axis during rotation of the shaft 32. In the position of the parts shown in FIG. 3 the motor is at rest and the contact 31 is spaced from the contact 30. However, when the motor operates the shaft 32 turns and causes the fly-weight 38 to turn outwardly about the pivot 37, and this fly-weight 38 will then engage the free end of the leaf spring 39 to turn this leaf spring in a clockwise direction about the connection to the top end of the shaft 40, as viewed in FIG. 3, so that the switch-actuating pin 41 advances upwardly, as viewed in FIG. 3, in order to close the switch 30, 31, and thus in this way during operation of the motor and turning of the shaft 32 thereof the switch 30, 31 will be closed. It is apparent that in this embodiment the leaf spring 39 forms a driven element which is driven by a drive means formed by the fly-weight 38, and this drive means in the form of a fly-weight 38 is itself driven directly from the motor 3. If for any reason the motor is prevented from operating so that its shaft 32 stops turning, then of course the driven element 39 will come to rest in the position shown in FIG. 3 and the switch 30, 31 will automatically open. The shaft 32 will stop turning either because it has come to the normal end of a cycle of operation or because something has happened to prevent the structure 35 from transporting the film further, such as, for example, reaching the end of the film strip, and in either of these events it is clear that the switch 30, 31 will open.

The lever 12 of FIG. 3 is actuated in the manner described above and operates in the same way to close and open the switch 7, 8, although there is no retarding mechanism retarding the return movement of the lever 12. It is clear that as soon as the switch 7, 8 is closed, the circuit of the motor 3 is placed in a condition where the motor 3 will start operating as soon as the switch 4 contacts the contact 5, even though the switch 30, 31 is open, because of the parallel connection of the switches 7, 8 and 30, 31. Once the motor starts to operate the switch 30, 31 will of course close in the manner described above, and thus even though the lever 12 returns immediately to its rest position as a result of the action of the spring 13 after the operator releases the lever 12, the opening of the switch 7, 8 will at this time not prevent operation of the motor 3 since the circuit remains closed by way of the switch 30, 31. The shaft 32 will only stop turning at the end of the cycle of operation or because of the reaching of the end of the film strip, as mentioned above, and as soon as the shaft 32 stops turning the switch 30, 31 will open and will thus open the circuit so that with this embodiment also the results of the invention will be produced. When the shaft 32 stops turning the leaf spring 39 by its own resiliency engages the fly-weight 38 to turn the latter back toward its rest position closer to the axis of the shaft 32.

Of course, the invention is not limited to the details described above. For example, the one-way drive 17–20 can take other known forms. Also, the retarding means can take other known forms. Moreover, the centrifugal control structure can have a different construction and also the centrifugal control structure together with the switch 30, 31 can be operatively connected to a shaft of the film-transporting drive 35 rather than to the motor shaft 32. Furthermore, the arm 10 need not be fixed to the lever 12. The arm 10 can form a separate lever which is operatively connected through an intermediate lever with the lever 12, and with such a construction the retarding means can cooperate either with the intermediate lever or with the lever 10. Moreover, such a lever 10, instead of being connected to the release lever 12, may cooperate with a lever of the shutter driving structure, and in such a construction the shutter driving structure cooperates with the lever 10 to move the latter in opposition to a spring from the element 9 which carries the contact 8 in such a way as to close the switch 7, 8 only during or immediately subsequent to running down of the shutter after making an exposure. With such a construction a retarding means as shown in FIG. 1 may be associated with such a lever 10, or the retarding means may cooperate with a lever of the shutter driving structure providing release of the lever 10 to close the switch 7, 8 immediately after the shutter has run down, or, of course, an additional switch as shown in FIG. 3 may be used. With this latter arrangement there is the possibility of operating the lever of the shutter drive in opposition to a spring by the running down of the shutter itself so as to move the lever 10 away from the element 9 and into a cooperative relation with a part of the timing mechanism or self-timer structure of the shutter which is connected with the usual timing mechanism through a one-way drive, such a self-timing mechanism being well-known and used for the purpose of delaying release of the shutter for a predetermined period of time after the shutter release is actuated by the operator. The lever of the shutter drive will then run down, deriving its energy from the tensioned spring which acts on this lever and will of course drive part of the timing mechanism until the predetermined time provided by the timing mechanism passes so that the lever 10 will again open the switch 7, 8. Of course, with such an arrangement a considerable simplification is provided inasmuch as an additional retarding means 16–26 or centrifugal control 36–41 is not required.

Referring to FIG. 5, there is shown therein a shutter corresponding to that shown in U.S. patent application, Serial No. 34,403, now Patent No. 3,069,989, at FIG. 3 thereof. This shutter includes a pair of rotary shutter rings 103 and 104 which turn in the direction of the arrow 164 during running down of the shutter in order to make an exposure, the ring 103 turning in advance of the ring 104 in order to open the shutter, and the ring 104 then following the ring 103 in order to close the shutter. The shutter is cocked by manual turning of the lever 154 in a counter-clockwise direction, as viewed in FIG. 5, and during cocking of the shutter both of the rings 103 and 104 turn together so that the shutter remains closed. During cocking of the shutter the springs 108 and 109 which are respectively connected to the rings 103 and 104 are tensioned. The lever 154 engages a pin carried by a lug which projects from the ring 103, and this lug engages a projection of the ring 104 to turn the latter with the ring 103 during cocking of the shutter. When the shutter is cocked a pawl 136 is urged by spring into engagement with a tooth at the periphery of ring 104 to prevent the latter, temporarily, from turning with the ring 103 during running down of the shutter. The cocking lever 154 turns the rings 103 and 104, during cocking of the shutter, until the lever 155 engages a projection 161 of the ring 103 to maintain the shutter in its cocked position.

In order to make an exposure, the operator turns the lever 12, shown also in FIG. 1, in a counter-clockwise direction, as viewed in FIG. 5, and a pin of the lever 12 engages the lever 155 to turn the latter also in a counter-clockwise direction, as viewed in FIG. 5, so as to release the ring 103 to the force of the tensioned spring 108 which now turns the ring 103 in the direction of the arrow 164 and with respect to the ring 104 so as to open the shutter to make the exposure. A lug which is carried by the ring 103 carries a pin 142 which engages the pawl 136 and turns the latter, as the ring 103 reaches its rest position, away from the ring 104 to release the latter to the spring 109 which now turns the ring 104 also in the direction of the arrow 164 so as to close the shutter and thus complete the exposure.

The shutter ring 104 carries a lever 165 which is electrically insulated from the ring 104, and the lever 165 engages a pin carried by a projection 166 of a rotary disc 167. This disc has an additional projection 168 which engages the switch contact 4 and maintains the latter, when the shutter is cocked, in engagement with the contact 6 so that the motor 3 is short-circuited, as described above. The contact 4 is springy so that when the ring 104 follows the ring 103 to close the shutter and terminate the exposure, the springy switch member 4 will turn the disc 167 and its projection 166 will follow the lever 165. In this way, when the shutter runs down the switch 4 will have reached the position shown in FIG. 5 where it engages the contact 5 so as to start the operation of the motor 3.

The motor 3, through the step-down transmission shown at the lower right of FIG. 5, drives the film-transporting sprocket roller 170 so as to transport the film. The roller 170 drives a gear 171 which meshes with a gear 175 to turn the latter. Coaxial with and freely turnable with respect to the gear 175 is a disc 172 carrying a pin 173 which projects through a slot of gear 175 which extends along an arc of a circle whose center is in the axis of gear 175. This pin 173 is connected by spring 176 to the gear 175, and the pin 173 engages a projection 169 of the disc 167 in the position of the parts shown in FIG. 5.

When the pin 173 has turned through one revolution, the film will have been transported by one film frame. Just before the pin 173 completes one revolution it engages the projection 169 and turns the disc 167 in a counter-clockwise direction, as viewed in FIG. 5, beyond the position shown in FIG. 5 through the slight distance required for the projection 168 to move contact 4 away from contact 5 and into engagement with contact 6, so that the motor 3 stops and is short-circuited. The pin 173 also stops, still engaging the projection 169, but due to inertia the gear 175 still turns through a slight distance in the direction of the arrow 174, at this time with respect to the disc 172, so that the arcuate slot turns with respect to the pin 173 and the spring 176 becomes tensioned so that the disc 167 maintains contact 4 in engagement with contact 6. When the operator again actuates the lever 154 to cock the shutter, the lever 165 will act through the projection 166 on the disc 167 to turn the latter further in a counter-clockwise direction to the original position of the disc 167, and this turning of the disc 167 is sufficient to turn the arm 169 with respect to the pin 173 to a position enabling the spring 176 to contract and move the pin 173 beyond the projection 169 back into engagement with the end of the arcuate slot of the gear 175, so that during the next running down of the shutter the arm 169 is free to turn in a clockwise direction past the pin 173, and then the above operations are repeated.

It will be understood that each of the elements described above, or two or more together, may also find a useful application in other types of cameras differing from the types described above.

While the invention has been illustrated and described as embodied in motor-driven cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehend within the meaning and range of equivalence of the following claims.

What is claimed as new and desired to be secured by Letters Patent is:

1. In a motor-driven still camera, in combination, electric motor means energized after actuation of a shutter of the camera to make an exposure and when thus energized operating automatically through one cycle of operations and then automatically stopping at the end of said cycle, said motor means during said cycle being adapted to perform such functions as cock the shutter and transport the film by one film frame after each exposure; an electric circuit in which said motor means is located, said circuit being automatically closed after actuation of the camera shutter and being automatically opened when said motor means reaches the end of said cycle, and said circuit including a battery which delivers energy to said motor means when the circuit is closed; and automatic means cooperating with said circuit for automatically opening said circuit whenever for any reason said motor means cannot complete said cycle, whereby the operation of said motor means is automatically terminated if a cycle is not completed.

2. In a motor-driven still camera, in combination, an electric motor adapted to perform such functions as cock the shutter and transport the film by one film frame after each exposure; an electric circuit in which said motor is located, said circuit including a battery which delivers energy to said motor when the circuit is closed; a driven element; drive means driving said driven element during at least part of the time when said circuit is closed and said motor operates; and automatic means cooperating with said driven element and with said circuit for automatically opening said circuit when said driven element comes to rest, whereby the operation of said motor is automatically terminated when said driven element stops moving, said driven element being a manually operable lever which is turned by the operator in connection with the making of an exposure and said drive means being a spring which urges said lever to a predetermined rest position from which said lever is turned by the operator in opposition to said spring, so that said spring drives said lever when the latter is released by the operator, and said circuit including a switch which is automatically opened by said lever when the latter reaches its rest position, so that said circuit will be opened whenever said lever is in said rest position irrespective of the actuation of parts of the camera by said motor.

3. In a camera as recited in claim 2, retarding means cooperating with said lever for retarding the return thereof to said rest position by said spring so that said switch will not be opened by said lever for a predetermined period after release of said lever by the operator.

4. In a motor-driven still camera, in combination, an electric motor adapted to perform functions such as cocking the shutter and transporting the film by one film frame after each exposure; an electrical circuit in which said motor is located, said circuit including a battery which delivers energy to said motor when the circuit is closed and a switch for opening and closing said circuit; manually operable lever means actuated by the operator when an exposure is to be made and having a rest position where said lever means cooperates with said switch to maintain the latter in an open position so that the circuit is open whenever said lever means is in said rest position thereof; spring means cooperating with said lever means for urging the same to said rest position thereof, so that the operator actuates said lever means in opposition to said spring means and so that said springs means returns said lever means to said rest position thereof when said lever means is released by the operator; retarding means for retarding the return of said lever to said rest position for a given length of time; and one-way drive means connecting said retarding means to said lever means for providing actuation of said retarding means by said lever means only during return of said lever means toward said rest position by said spring means.

5. In a camera as recited in claim 4, said lever means including a first lever cooperating with said switch, a second lever actuated by the operator, and an intermediate lever transmitting movement between said first and second levers.

6. In a camera as recited in claim 5, said one-way drive connecting said retarding means to said intermediate lever.

7. In a motor-driven still camera, in combination, an electric motor adapted to perform functions such as cocking the shutter and advancing the film by one film frame after each exposure; an electric circuit in which said motor is located, said circuit including a battery which provides energy for driving the motor when the circuit is closed and a switch; lever means having a rest position where said lever means maintains said switch in an open position so that the circuit is open as long as said lever means is in said rest position thereof, said lever means being adapted to be moved away from said rest position thereof by the operator when an exposure is made, so that the circuit can then be closed; spring means cooperating with said lever for urging the same back to said rest position so that the circuit will be opened and the motor will be incapable of operating upon return of said lever to said rest position; and means connecting said lever to the structure which drives the shutter of the camera.

8. In a camera as recited in claim 7, retarding means retarding the return of said lever to said rest position thereof, said retarding means forming part of the timing mechanism of the shutter or part of a self-timing mechanism of the camera.

9. In a camera as recited in claim 1, said automatic means including a centrifugally driven member operatively connected to said motor means to be driven thereby and a switch forming part of said circuit and maintained in a closed position by said centrifugally driven member only as long as the motor continues to run during said cycle, so that when the motor means tops operating the circuit automatically opens even if a cycle of operations of said motor means is not completed.

10. In a motor-driven still camera, in combination, an electric motor adapted to perform functions such as cocking the shutter and advancing the film by one film frame after each exposure; an electric circuit in which said motor is located, said circuit including a battery from which the motor derives its energy when the circuit is closed and said circuit also including a pair of switches which are connected in parallel; manually operable lever means maintaining one of said pair of switches open when said lever means is in a rest position, said lever means being actuated by the operator and moved from its rest position in connection with the making of an exposure, so that when said lever means is moved from its rest position by the operator the circuit closes as a result of closing of said one switch and the motor starts to operate; spring means returning said lever means to its rest position where it opens said one switch upon release of said lever means by the operator; and centrifugal means driven by said motor and cooperating with the other of said pair of switches for closing the latter as long as the motor operates, whereby the motor will continue to operate after said one switch opens upon return of said lever means to said rest position thereof but will automatically open the circuit whenever the motor stops advancing film either because the film has been advanced by one film frame or because the film cannot move further for any reason.

11. In a camera as recited in claim 10, said centrifugal means being carried and driven by the shaft of the motor.

12. In a camera as recited in claim 10, film transporting means driven by said motor, said centrifugal means being driven by said film transporting means.

13. In a motor-driven still camera, in combination, an electric motor adapted to perform functions such as cocking the shutter and transporting the film by one film frame after each exposure; an electric circuit in which said motor is located, said circuit including a battery which supplies energy for said motor and a pair of switches which are connected in parallel; a manually operable lever having a rest position where it maintains one of said switches open; spring means urging said lever to said rest position thereof, said lever being moved in opposition to said spring means from said rest position in connection with the making of an exposure, so that said one switch then closes to close the circuit and start the motor, and said one switch again opening when said spring means returns said lever to said rest position thereof; a carrier member fixed to said motor for rotation therewith; a fly-weight carried by said carrier member and moving centrifugally in a predetermined direction during rotation of said carrier member with said motor; a leaf spring also carried by said carrier member and moved in a predetermined direction by said fly-weight upon rotation of said carrier member; and a switch-actuating member carried by said leaf spring and closing said other of said pair of switches when said leaf spring is moved by said fly-weight, so that the circuit is maintained closed and the motor continues to operate until said carrier member stops turning.

References Cited by the Examiner
UNITED STATES PATENTS

| 2,969,722 | 1/61 | Schwartz | 95—31 |
| 3,007,385 | 11/61 | Fukuoka | 95—31 |

EVON C. BLUNK, *Primary Examiner.*

JAMES W. LOVE, *Examiner.*